2,878,875
CEMENT

Irving R. Dunlap and Freeman D. Patchen, Dallas, Tex., assignors, by mesne assignments, to Socony Mobil Oil Company, Inc., a corporation of New York No Drawing. Application June 30, 1954
Serial No. 440,536

12 Claims. (Cl. 166—31)

This invention relates to cements and relates more particularly to hydraulic cement slurries.

In the application of hydraulic cement slurry to porous bodies, the tendency of the slurry to lose fluid creates difficulties. Thus, for example, in the cementing of wells, with loss of fluid from the aqueous cement slurry to porous subterranean formations, stiffening or premature setting of the cement often occurs with attendant difficulty or impossibility of completing the cementing operation, reduction in the permeability of the formation, swelling or erosion of shale formations, reduced strength of the cement, or other undesired results. Accordingly, the loss of fluid from hydraulic cement slurry desirably should be as low as possible.

In the application of hydraulic cement slurry, it is also desirable that the time required for setting of the cement be sufficiently long to permit placing of the cement slurry. Thus, for example, again in the cementing of wells, relatively long periods of time are often required to pump the cement slurry into place. Further, high temperatures are often encountered which decrease the setting time of the cement. Accordingly, the setting time of the cement should be such as to permit pumping of sufficient amounts of the cement slurry from the surface of the ground to the desired position in the well.

It is an object of this invention to reduce the fluid loss of cement slurry. It is another object of this invention to delay the setting time of cement. It is another object of this invention to provide a cement slurry having reduced fluid loss and delayed setting time. It is another object of this invention to control the setting time of cement. It is another object of this invention to provide an improved cement. It is another object of this invention to reduce fluid loss and minimize premature setting of cement in a well. It is another object of this invention to reduce damage to subterranean formations caused by loss of fluid from cement slurries. Further objects of the invention will become apparent from the following detailed description.

In accordance with the invention, there is provided a slurry comprising a hydraulic cement in admixture with, as the liquid phase, a water-in-oil emulsion containing an emulsifier for water-in-oil emulsions.

In this slurry, the fluid loss is low. In fact, over a wide temperature range, the fluid loss of the slurry is essentially zero. The oil in the emulsion is the continuous phase and the water is held in suspension in the form of small droplets. Further, setting of the cement will not occur as long as the oil in the emulsion remains as the continuous phase. With breaking or inversion of the emulsion, i.e., conversion of the water-in-oil emulsion to an oil-in-water emulsion with the water as the continuous phase, setting of the cement begins. Stability with respect to time of the water-in-oil emulsion is a function of temperature, the amount and properties of the emulsifier, the water-to-oil ratio, and the ratio of emulsion to hydraulic cement. Thus, the time that setting of the cement is delayed is amenable to control. Accordingly, with fluid loss minimized, the hazard of hardening or premature setting through loss of fluid upon application of the cement slurry to a porous body is reduced, and, with setting time amenable to control, sufficient time for placing the cement slurry is obtained.

In the practice of the invention, any type of hydraulic cement may be employed. By hydraulic cement is meant a cement which will set under the action of water. Preferably, Portland cement is employed. However, any mixture containing lime, silica, and alumina, and commonly used as a hydraulic cement, is satisfactory.

The oil employed in the liquid phase of the cement slurry, namely, the water-in-oil emulsion, is preferably a hydrocarbon oil. Suitable hydrocarbon oils comprise crude oil, Diesel oil, kerosene, gas oil, distillate oil, and other petroleum oils. Where hydrocarbon oils are employed, however, it is preferred that the composition of the oil be such as to prevent excessive evaporation under the conditions of use. Vegetable oils may be used, if desired. Thus, cottonseed oil, castor oil, rape seed oil, tung oil, linseed oil, and other types of vegetable oils may be employed. Animal oils such as sperm oil and other fish oils may also be employed.

The water-in-oil emulsion may contain between about 10 percent and about 75 percent by volume of oil. With amounts of oil much below about 10 percent by volume of the mixture of water and oil, difficulty is encountered in obtaining a water-in-oil emulsion. On the other hand, with amounts of oil above about 75 percent by volume of the mixture of water and oil, the large volume of the chemically inactive oil in the slurry may severely reduce the strength of the set cement. Preferably, the emulsion contains between about 20 and 40 percent by volume of oil.

The amount of emulsion with respect to the amount of hydraulic cement in the slurry may vary. Thus, for example, the slurry may containing as little as about 30 parts by weight of emulsion to 100 parts by weight of hydraulic cement. The slurry may also contain as much as 70 parts by weight of emulsion to 100 parts by weight of hydraulic cement. Preferably, the slurry contains about 50 parts by weight of emulsion to 100 parts by weight of hydraulic cement.

The emulsion contains an emulsifier for water-in-oil emulsions. These emulsifiers are characterized by being surface active, i.e., having a tendency to concentrate at a water-oil interface, diffuse rapidly through a fluid phase to the water-oil interface, are hydrophobic, and have an orientation at the water-oil interface such as to give the lowest possible free interfacial energy. Also, they are generally more oil-soluble than water-soluble.

As an emulsifier, an oil-soluble sulfonic acid or oil-soluble derivative thereof may be employed. Included among suitable oil-soluble derivatives of a sulfonic acid are the monovalent, divalent, and trivalent salts of a sulfonic acid. If desired, mixtures may be employed. By sulfonic acid is meant an organic compound containing the radical $-SO_2OH$ or $-SO_3H$. The oil-soluble sulfonic acids may be alkyl, aryl, aralkyl, or alkaryl sulfonic acids. These sulfonic acids are obtained by reaction between a suitable hydrocarbon and a sulfonating agent such as sulfuric acid, sodium sulfite, etc. The hydrocarbon may be in mixture with other hydrocarbons, such as a crude petroleum oil or an animal or fish oil or fat and the mixture may have been subjected to the sulfonation treatment. Satisfactory results have been obtained by employing an oil-soluble petroleum sulfonate or an oil-soluble sulfonated sperm oil. A satisfactory petroleum sulfonate is one having a molecular weight between 440 and 470. A satisfactory sulfonated animal fat is one having a molecular weight between 250 and 600. Particularly satisfactory results have been obtained by employing the petroleum sulfonate sold under the trade name "Petronate" and by employing the sulfonated animal fat sold under the trade name "Control Emulsion."

In connection with the selection of any particular derivative of any particular sulfonic acid, the effect on emulsification will reside primarily in the particular sulfonic acid from which the derivative was obtained. This is due to the fact that hydraulic cement contains calcium ions and these calcium ions are capable of reacting with the sulfonic acid or the derivative thereof to convert it to the calcium salt of the sulfonic acid. Accordingly, for any particular sulfonic acid, the calcium salt of the acid will be present in the slurry. However, the effect on other properties of the cement slurry of the cation displaced by the calcium may differ with different derivatives.

Other suitable emulsifiers may also be employed. These emulsifiers include sorbitan monooleate, sorbitan sesquioleate, sorbitan trioleate, sorbitan tristearate, lecithin, amino propyl tallow amine, polyoxyethylene sorbitol tetraoleate, and polyoxyethylene sorbitol pentaoleate. Mixtures of various emulsifiers may be employed, if desired.

The emulsifier may be employed in an amount up to about ten percent by weight of the emulsion. Preferably, the emulsifying agent is employed in the amount between two and six percent by weight of the emulsion. Satisfactory results have been obtained employing emulsifying agent in the amount of about three to four percent by weight of the emulsion.

In preparation of the slurry, the water and oil may be mixed together with the emulsifier and thereafter the hydraulic cement added. Where this procedure is followed, it is desirable that the mixture of water, oil, and emulsifier contain calcium ion, which calcium ion may be provided by including within the mixture a suitable calcium salt such as calcium chloride. The hydraulic cement may be admixed with the oil and thereafter the water and emulsifier added. The slurry may also be prepared by admixing the hydraulic cement with the water and thereafter adding the oil and emulsifier. However, this latter procedure is usually not to be preferred if delay in the addition of the oil and the emulsifier might be encountered.

Where amounts of emulsifier less than about three percent by weight of the emulsion are employed, difficulty is encountered occasionally in obtaining an emulsion wherein the oil is the continuous phase. Difficulty along this line can be avoided by first admixing all of the emulsifier with all of the oil. Thereafter, the hydraulic cement and the water are added alternately in increments to the oil containing the emulsifier. Usually the increments need not be smaller than about one-quarter the total amount of the hydraulic cement or the water although smaller increments may be employed.

As stated hereinabove, the stability of the water-in-oil emulsion, and thus the time that setting of the cement slurry is delayed, is a function of the temperature, the amount and properties of the emulsifier, the water-to-oil ratio, and the ratio of emulsion to hydraulic cement. Generally, for any given emulsifying agent, the stability of the emulsion will decrease with increasing temperature. However, the stability will increase with increasing amounts of emulsifying agents. Similarly, the stability will increase with the ratio of oil to water and with ratio of emulsion to hydraulic cement. The effects of the temperature, amount of emulsifying agent, and the ratio of oil to water are interrelated. Additionally, conditions of mixing of the oil, water, and hydraulic cement, pressure on the slurry thereafter, and the presence of foreign surfaces affect the stability of the emulsion. Accordingly, no quantitative rule can be given with respect to the time the emulsion in any slurry will remain stable. However, for any particular slurry of hydraulic cement, the time that the emulsion will remain stable may be determined by test either under actual conditions of use or under simulated conditions.

The following examples will be illustrative of the invention.

Seven cement slurries comprising Portland cement, water-in-oil emulsion, and emulsifier were prepared. The Portland cement was ASTM Type I Portland cement. Four of the slurries contained two emulsifiers and three of the slurries contained a single emulsifier, the amounts differing in each slurry. The emulsifiers were petroleum sulfonate having a molecular weight between 440 and 470 and sulfonated animal fat having a molecular weight between 250 and 600. Four of the slurries differed from three other of the slurries with respect to the volume ratio of the oil-to-water in the emulsion. However, the weight ratio of emulsion to Portland cement was the same in each slurry. In each case, the slurry was prepared by mixing diesel oil, water, and emulsifier or emulsifiers to form a water-in-oil emulsion. Thereafter, the emulsion was admixed with the Portland cement in the weight ratio of 50 pounds of emulsion to 100 pounds of Portland cement. The following table gives the slurry number, the volume ratio of oil-to-water in the emulsion, and the type and amount of emulsifier or emulsifiers employed. The amount of emulsifier is given as the weight percent of the emulsion.

Table 1

| Slurry No. | Emulsifier | Volume Ratio Oil to Water in Emulsion | Amount of Emulsifier |
|---|---|---|---|
| 1 | Petroleum sulfonate / sulfonated animal fat | 0.33 | 1 / 1 |
| 2 | Petroleum sulfonate / sulfonated animal fat | 0.38 | 1.25 / 1.25 |
| 3 | Petroleum sulfonate / sulfonated animal fat | 0.33 | 2 / 1 |
| 4 | Petroleum sulfonate / sulfonated animal fat | 0.33 | 2 / 2 |
| 5 | Petroleum sulfonate | 0.33 | 3 |
| 6 | ......do...... | 0.38 | 4 |
| 7 | ......do...... | 0.38 | 6 |

A portion of each of these slurries was tested for fluid loss employing the procedure set forth in API Code 29. The fluid loss of slurries Nos. 1 and 2 was measured at 80° F. and 140° F. whereas the fluid loss of slurries Nos. 3 to 7 was measured at 80° F. and 180° F. In every case, the fluid loss was essentially zero.

Another portion of each of the slurries was tested for pumping time as a measure of stability of the emulsion. A high pressure consistometer was employed. In the consistometer, conditions of temperature and pressure simulating the conditions encountered by a cement during pumping in a well in the earth are reproduced. API Cementing Practice Code RP10D sets out temperature and pressure conditions for pumping to various depths, i.e., sets forth pumping schedules, and the time that the cement should remain pumpable to be regarded as satisfactory for use in an oil well. A cement slurry is regarded, in accordance with the code, as being pumpable until its viscosity exceeds 100 poises. The slurries were tested for pumping time employing different pumping schedules. With the exception of slurries Nos. 5 and 7, the tests were discontinued prior to the time that the slurries attained a viscosity of 100 poises. The table below gives the slurry number, the pumping schedule, the pumping time set forth in the API Code, and the pumping time of the slurry.

Table 2

| Slurry No. | Pumping Schedule, Feet | API Minimum Pumping Time, Minutes | Pumping Time, Minutes |
|---|---|---|---|
| 1 | 10,000 | 65 | 180 |
| 2 | 10,000 | 65 | 190 |
| 3 | 12,000 | 74 | 160 |
| 4 | 12,000 | 74 | 200 |
| 5 | 14,000 | 84 | 148 |
| 6 | 14,000 | 84 | 155 |
| 6 | 16,000 | 91 | 96 |
| 7 | 18,000 | 100 | 106 |

A number of portions of each of the slurries were then heated to different temperatures and maintained at these temperatures for different times. Following the period of heating, the compressive strength of each portion was determined. The table gives the slurry number and the compressive strength, in pounds per square inch, for various of the temperatures and times.

Table 3

| Slurry No. | Compressive Strength After 24 Hours, p.s.i. | | | Compressive Strength After 3 Days, p.s.i. | |
|---|---|---|---|---|---|
| | 140° F. | 180° F. | 275° F. | 140° F. | 180° F. |
| 1 | 443 | 712 |  | 710 | 1,080 |
| 2 | 40 | 437 |  | 658 |  |
| 3 | 0 | 590 |  | 540 |  |
| 4 | 0 | 563 |  | 307 |  |
| 5 | 0 | 673 |  | 715 | 950 |
| 6 | 0 | 650 |  |  |  |
| 7 | 0 |  | 477 |  | 800 |

It will be noted from the examples that the fluid loss of the cement slurries was essentially zero. It will also be noted that the pumping time of the slurries was in excess of the time regarded as a minimum for the various pumping schedules set forth in the API Code. It will be further noted that the compressive strengths of the slurries after setting were satisfactorily high. In this connection, the compressive strength for slurry No. 2 of 40 pounds per square inch after 24 hours at 140° F. indicates that setting had just begun and the zero compressive strengths of slurries Nos. 3 to 7 after the same time at the same temperature indicate that setting had not yet begun. The examples also demonstrate the control of pumping time and compressive strength with variation in the amount of emulsifier.

Having thus described our invention, it will be understood that such description has been given by way of illustration and example and not by way of limitation, reference for the latter purpose being had to the appended claims.

We claim:

1. A slurry comprising a hydraulic cement in admixture with as essentially the entire liquid phase of said slurry a water-in-oil emulsion, said emulsion comprising water as the dispersed phase and oil in an amount between about 10 and 75 percent by volume of said emulsion as the continuous phase and said emulsion containing in an amount sufficient to effect temporary emulsification of said water and said oil an emulsifier for water-in-oil emulsions, and said slurry containing between about 30 and 70 parts by weight of said emulsion to 100 parts by weight of said hydraulic cement.

2. The slurry of claim 1 wherein said oil is in an amount between about 20 and 40 percent by volume of said emulsion.

3. The slurry of claim 1 wherein said slurry contains about 50 parts by weight of said emulsion to 100 parts by weight of said hydraulic cement.

4. The slurry of claim 1 wherein said emulsifier for water-in-oil emulsions is in an amount up to about 10 percent by weight of said emulsion.

5. The slurry of claim 1 wherein said emulsifier for water-in-oil emulsions is in an amount between 2 and 6 percent by weight of said emulsion.

6. The slurry of claim 1 wherein said emulsifier for water-in-oil emulsions is in an amount between about 3 and 4 percent by weight of said emulsion.

7. In the process of treating a well in the earth wherein a slurry of cement is pumped into said well, the steps which include forming a slurry comprising a hydraulic cement in admixture with as essentially the entire liquid phase of said slurry a water-in-oil emulsion, said emulsion comprising water as the dispersed phase and oil in an amount between about 10 and 75 percent by volume of said emulsion as the continuous phase and said emulsion containing in an amount sufficient to effect temporary emulsification of said water and said oil an emulsifier for water-in-oil emulsions, and said slurry containing between about 30 and 70 parts by weight of said emulsion to 100 parts by weight of said hydraulic cement, and pumping said slurry into said well.

8. The process of claim 7 wherein said oil is in an amount between about 20 and 40 percent by volume of said emulsion.

9. The process of claim 7 wherein said slurry contains about 50 parts by weight of said emulsion to 100 parts by weight of said hydraulic cement.

10. The process of claim 7 wherein said emulsifier for water-in-oil emulsions is in an amount up to about 10 percent by weight of said emulsion.

11. The process of claim 7 wherein said emulsifier for water-in-oil emulsions is in an amount between 2 and 6 percent by weight of said emulsion.

12. The process of claim 7 wherein said emulsifier for water-in-oil emulsions is in an amount between about 3 and 4 percent by weight of said emulsion.

References Cited in the file of this patent

UNITED STATES PATENTS

| | | |
|---|---|---|
| 1,772,999 | Huber | Aug. 12, 1930 |
| 2,071,263 | Phillips | Feb. 16, 1937 |
| 2,279,262 | Edwards | Apr. 7, 1942 |
| 2,285,302 | Patterson | June 2, 1942 |
| 2,390,225 | Sherman et al. | Dec. 4, 1945 |
| 2,585,336 | McCoy | Feb. 12, 1952 |
| 2,684,720 | Lea | July 27, 1954 |
| 2,798,003 | Morgan et al. | July 2, 1957 |